United States Patent
Shiono et al.

(10) Patent No.: US 9,518,172 B2
(45) Date of Patent: Dec. 13, 2016

(54) RUBBER COMPOSITION AND METHOD FOR PRODUCING RUBBER COMPOSITION

(71) Applicant: BRIDGESTONE CORPORATION, Chuo-ku, Tokyo (JP)

(72) Inventors: Takeshi Shiono, Kodaira (JP); Takumi Toda, Kodaira (JP); Satoshi Horie, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/381,079

(22) PCT Filed: Feb. 26, 2013

(86) PCT No.: PCT/JP2013/054958
§ 371 (c)(1),
(2) Date: Aug. 26, 2014

(87) PCT Pub. No.: WO2013/129394
PCT Pub. Date: Sep. 6, 2013

(65) Prior Publication Data
US 2015/0031821 A1 Jan. 29, 2015

(30) Foreign Application Priority Data

Mar. 2, 2012 (JP) ................................. 2012-046877
Mar. 2, 2012 (JP) ................................. 2012-046892

(51) Int. Cl.
| | |
|---|---|
| C08K 5/548 | (2006.01) |
| C08L 7/00 | (2006.01) |
| C08K 13/02 | (2006.01) |
| C08K 5/17 | (2006.01) |
| C08K 5/3415 | (2006.01) |
| C08L 9/06 | (2006.01) |
| C08L 21/00 | (2006.01) |
| C08K 5/37 | (2006.01) |
| C08K 3/36 | (2006.01) |
| C08K 3/06 | (2006.01) |

(52) U.S. Cl.
CPC ................ C08K 13/02 (2013.01); C08K 3/06 (2013.01); C08K 3/36 (2013.01); C08K 5/175 (2013.01); C08K 5/3415 (2013.01); C08K 5/37 (2013.01); C08K 5/548 (2013.01); C08L 7/00 (2013.01); C08L 9/06 (2013.01); C08L 21/00 (2013.01)

(58) Field of Classification Search
CPC ......... C08K 5/548; C08K 13/02; C08K 5/175; C08K 5/3415; C08K 5/37; C08K 3/36; C08K 3/06; C08L 7/00; C08L 9/06; C08L 21/00
USPC ........................................................ 524/525
See application file for complete search history.

(56) References Cited

U.S. PATENT DOCUMENTS

| | | | |
|---|---|---|---|
| 4,254,016 | A | 3/1981 | Onizawa |
| 4,289,861 | A | 9/1981 | Onizawa |

FOREIGN PATENT DOCUMENTS

| | | |
|---|---|---|
| CN | 102112538 A | 6/2011 |
| EP | 2098564 A1 | 9/2009 |
| EP | 2518104 A1 | 10/2012 |
| JP | 52-136244 A | 11/1977 |
| JP | 54-100448 A | 8/1979 |
| JP | 61-221242 A | 10/1986 |
| JP | 2003-514079 A | 4/2003 |
| JP | 2009-019097 A | 1/2009 |
| JP | 2009-019098 A | 1/2009 |
| JP | 2009-046578 A | 3/2009 |
| WO | 2007/066689 A1 | 6/2007 |
| WO | 2010000299 A1 | 1/2010 |

OTHER PUBLICATIONS

JP 2009-019097 English language machine translation, Jan. 2009.*
International Search Report for PCT/JP2013/054958 dated Apr. 23, 2013.
Communication dated Jul. 7, 2015 from the State Intellectual Property Office of the People's Republic of China in counterpart application No. 201380012179.6.
Communication dated Aug. 3, 2015 from the European Patent Office in counterpart application No. 13754404.5.

\* cited by examiner

*Primary Examiner* — Angela C Scott
(74) *Attorney, Agent, or Firm* — Sughrue Mion, PLLC

(57) ABSTRACT

The present invention provides a rubber composition comprising, as blended, a rubber component (A), an amino acid derivative (B) and a filler containing an inorganic filler (C), and further containing, as incorporated therein, at least one selected from sulfur and a sulfur compound. The vulcanization rate of the rubber composition is accelerated and the low-heat-generation property thereof is excellent.

5 Claims, No Drawings

RUBBER COMPOSITION AND METHOD FOR PRODUCING RUBBER COMPOSITION

CROSS REFERENCE TO RELATED APPLICATIONS

This application is a National Stage of International Application No. PCT/JP2013/054958 filed Feb. 26, 2013, claiming priority based on Japanese Patent Application No. 2012-046877, filed Mar. 2, 2012 and 2012-046892, filed Mar. 2, 2012, the contents of all of which are incorporated herein by reference in their entirety.

TECHNICAL FIELD

The present invention relates to a rubber composition having a vulcanization accelerating effect and capable of improving low-heat-generation property, and to a method for producing the rubber composition.

BACKGROUND ART

A vulcanization accelerator for rubber is synthesized using a fossil resource such as petroleum or the like as a starting material. In consideration of stable supply of fossil resources, price escalation thereof and the like in future, a vulcanization accelerator not using a fossil resource as a starting material is desired. A technique of using, as a vulcanization accelerator, an amino acid made from a biomass material, is disclosed in PTL 1 and 2 mentioned below, which, however, is problematic in that the amino acid could not sufficiently provide an effect as a vulcanization acceleration efficiency improving agent.

Recently, in association with the movement of global regulation of carbon dioxide emission associated with the increase in attraction to environmental concerns, the demand for low fuel consumption by automobiles is increasing. To satisfy the requirement, it is desired to reduce the rolling resistance of tires. As a method for reducing the rolling resistance of tires, there is mentioned a method of applying a rubber composition having a low-heat-generation property to tires.

As a method of obtaining a rubber composition having a low-heat-generation property, there is mentioned a method of using, for a rubber composition of a synthetic dienic rubber, a polymer that has an increased affinity to carbon black and silica (for example, see PTL 3). For a natural rubber, there is mentioned a method of incorporating a highly-reactive carbon black to a modified natural rubber prepared by modifying a natural rubber (for example, see PTL 4).

According to PTL 3 and 4, the heat-generation property of a rubber composition can be lowered by increasing the affinity of the rubber component to the filler such as carbon black or the like. Accordingly, tires having a low hysteresis loss can be obtained.

However, with further advance of low fuel consumption by automobiles, it is desired to further improve the low-heat-generation property of tires.

CITATION LIST

Patent Literature

PTL 1: JP-A S61-221242
PTL 2: JP-A 2009-19098
PTL 3: JP-A 2003-514079
PTL 4: WO2007/066689

SUMMARY OF INVENTION

Technical Problem

The present invention is intended to provide a rubber composition which uses an amino acid derivative and can therefore accelerate the vulcanization rate and can improve the low-heat-generation property of tires.

Solution to Problem

For solving the above-mentioned problems, the inventors have made various experimental analyses and, as a result, have found that, in a composition comprising a rubber component and, as incorporated therein, a filler containing an inorganic filler, when an amino acid derivative and additionally at least one selected from sulfur and a sulfur compound are incorporated as a vulcanization accelerator therein, then the effect as the vulcanization acceleration efficiency improving agent can be enhanced more than in the case of using an amino acid as in the above, and the dispersibility of the filler can be further improved, and have completed the present invention.

Specifically, the present invention provides:

a rubber composition comprising, as blended, a rubber component (A), an amino acid derivative (B) and a filler containing an inorganic filler (C), and further containing, as incorporated therein, at least one selected from sulfur and a sulfur compound.

Advantageous Effects of Invention

According to the present invention, a rubber composition is developed that uses an amino acid derivative and can accelerate the vulcanization rate. Further, according to the present invention, a rubber is deveolped composition capable of improving the low-heat-generation property of tires and a production method for the rubber composition.

DESCRIPTION OF EMBODIMENTS

The present invention is described in detail hereinunder.
[Rubber Composition]
The rubber composition of the present invention is a rubber composition comprising a rubber component (A), an amino acid derivative (B) and a filler containing an inorganic filler (C), and further containing, as incorporated therein, at least one selected from sulfur and a sulfur compound.

By incorporating an amino acid derivative (B) in the rubber composition, the vulcanization rate of the composition can be accelerated, the dispersibility of the filler is greatly improved, and the low-heat-generation property of the rubber composition is remarkably improved.

The content of the amino acid derivative (B) in the rubber composition of the present invention is preferably from 0.01 to 15 parts by mass relative to 100 parts by mass of the rubber component (A) therein. When the content of the amino acid derivative (B) is 0.01 parts by mass or more, then the component could sufficiently exhibit the effect thereof of improving the dispersibility of the filler in the composition, and when 15 parts by mass or less, then the component would not have any significant effect on the vulcanization rate. More preferably, the blending amount of the amino acid derivative (B) is from 0.1 to 10 parts by mass relative to 100 parts by mass of the rubber component (A).

[Rubber Component (A)]

The rubber component (A) for use in the rubber composition of the present invention may be selected from a natural rubber and a synthetic dienic rubber. As the synthetic dienic rubber, usable here are styrene-butadiene copolymer rubber (SBR), polybutadiene rubber (BR), polyisoprene rubber (IR), butyl rubber (IIR), ethylene-propylene-diene tercopolymer rubber (EPDM), etc. One alone or two or more different types of natural rubber and synthetic dienic rubber may be used here either singly or as blended.

[Amino Acid Derivative (B)]

The amino acid derivative (B) preferably contains an amino acid derivative which has at least one or more amino groups or imino groups in the molecule and has at least one or more carboxylic acids and in which the acid moiety of the carboxylic acid is chemically modified. Here, the chemically-modified carboxylic acid indicates a structure in which the hydrogen atom of the carboxylic acid is substituted with a hydrocarbon group, an alkali metal or an alkaline earth metal.

As the amino acid derivative (B) in the present invention, preferably, at least one selected from those represented by the following general formulae (Ia), (Ib) and (Ic) is used.

<Amino Acid Derivative of General Formula (Ia)>

[Chem. 1]

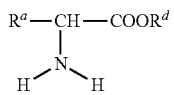

(Ia)

[In the formula, $R^a$ represents a hydrogen atom, an aliphatic hydrocarbon group, an alicyclic hydrocarbon group, or an aromatic hydrocarbon group, and the aliphatic hydrocarbon group, the alicyclic hydrocarbon group and the aromatic hydrocarbon group each may be substituted with a hydroxyl group, an amino group, a guanidyl group, an imidazolyl group, a carboxyl group, a mercapto group, a methylsulfanyl group, or an indol-3-yl group, $R^d$ is selected from a hydrogen atom, an aliphatic hydrocarbon group, an alicyclic hydrocarbon group, an aromatic hydrocarbon group, an alkali metal and an alkaline earth metal.]

Here, the aliphatic hydrocarbon group of $R^a$ and $R^d$ is preferably an aliphatic hydrocarbon group having from 1 to 10 carbon atoms, the alicyclic hydrocarbon group thereof is preferably an alicyclic hydrocarbon group having from 3 to 10 carbon atoms, and the aromatic hydrocarbon group thereof is preferably an aromatic hydrocarbon group having from 6 to 10 carbon atoms.

In case where $R^d$ is selected from an alkali metal and an alkaline earth metal, the alkali metal is preferably lithium, sodium or potassium, and the alkaline earth metal is preferably magnesium or calcium. In case where $R^a$ is an aliphatic hydrocarbon group, an alicyclic hydrocarbon group or an aromatic hydrocarbon group, the group may be substituted with a hydroxyl group, an amino group, a guanidyl group, an imidazolyl group, a carboxyl group, a mercapto group, a methylsulfanyl group, or an indol-3-yl group.

Preferred cases of $R^a$ in the above-mentioned general formula (Ia) are mentioned. Of the aliphatic hydrocarbon group having from 1 to 10 carbon atoms, preferred is a linear or branched alkyl group having from 1 to 5 carbon atoms, and there are mentioned a methyl group, an ethyl group, an isopropyl group, an isobutyl group, a 1-methylpropyl group, a monohydroxymethyl group, a 1-hydroxyethyl group, a 4-aminobutyl group, a 3-hydroxy-4-aminobutyl group, a guanidylpropyl group, a monocarboxymethyl group, a monoaminocarbonylmethyl group, a 2-carboxyethyl group, a 2-aminocarbonylethyl group, a monomercaptomethyl group, a 2-methylmercaptoethyl group.

Preferred examples of the amino acid derivative represented by the general formula (Ia) include arginine ethyl ester, arginine sodium salt, arginine potassium salt, cysteine ethyl ester, cysteine sodium salt.

<Amino Acid Derivative of General Formula (Ib)>

[Chem. 2]

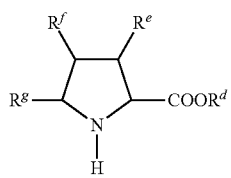

(Ib)

[In the formula, $R^d$ is the same as $R^d$ in the above-mentioned general formula (Ia), and $R^d$ is selected from a hydrogen atom, an aliphatic hydrocarbon group, an alicyclic hydrocarbon group, an aromatic hydrocarbon group, an alkali metal and an alkaline earth metal. $R^e$, $R^f$ and $R^g$ are the same as $R^a$ in the general formula (Ia), or are selected from a hydroxyl group.]

Preferred examples of the amino acid derivative represented by the general formula (Ib) include proline sodium salt, and proline potassium salt.

<Amino Acid Derivative of General Formula (Ic)>

[Chem. 3]

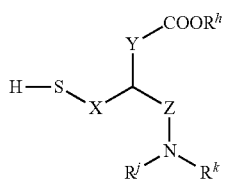

(Ic)

[In the formula, X represents a divalent hydrocarbon group having a linear alkylene group and having from 1 to 10 carbon atoms, Y and Z each independently represent a single bond or an alkylene group having from 1 to 10 carbon atoms, $R^h$ is selected from a hydrogen atom, an aliphatic hydrocarbon group, an alicyclic hydrocarbon group, an aromatic hydrocarbon group and an alkali metal, $R^j$ and $R^k$ each are independently selected from a hydrogen atom, an aliphatic hydrocarbon group, an alicyclic hydrocarbon group, an aromatic hydrocarbon group and an acyl group, the —COO moiety may form a salt with an amine, the —NR$^j$R$^k$ moiety may form a salt with an acid. However, when $R^h$, $R^j$ and $R^k$ are all hydrogen atoms, the compound must form a salt, and in case where the compound does not form a salt, at least one of $R^h$, $R^j$ and $R^k$ is not a hydrogen atom.]

The amino acid derivative of the above-mentioned general formula (Ic) is a compound derived from cysteine, especially from L-cysteine, and does not include cysteine itself.

In the general formula (Ic), X is preferably a methylene group, an ethylene group, a propane-1,3-diyl group, a propane-1,2-diyl group, a butane-1,4-diyl group, a butane-1,3-diyl group, a butane-1,2-diyl group, a pentane-1,5-diyl group, a pentane-1,4-diyl group, a pentane-1,3-diyl group, a pentane-1,2-diyl group, a hexane-1,6-diyl group, a hexane-1,5-diyl group, a hexane-1,4-diyl group, a hexane-1,3-diyl group, or a hexane-1,2-diyl group.

Preferably, Y and Z are each independently a single bond, a methylene group, an ethylene group, a propane-1,3-diyl group, a propane-1,2-diyl group, a butane-1,4-diyl group, a butane-1,3-diyl group, a butane-1,2-diyl group, a pentane-1,5-diyl group, a pentane-1,4-diyl group, a pentane-1,3-diyl group, a pentane-1,2-diyl group, a hexane-1,6-diyl group, a hexane-1,5-diyl group, a hexane-1,4-diyl group, a hexane-1,3-diyl group, or a hexane-1,2-diyl group. Here, the case where Z is a single bond means that the carbon atom to be the center of X, Y and Z bonds to the nitrogen atom directly via a single bond. The same shall apply to the case where Y is a single bond.

In the above-mentioned general formula (Ic) where $R^h$, $R^j$ and $R^k$ each are an aliphatic hydrocarbon group, preferably, each of them are independently a methyl group, an ethyl group, a propyl group, a butyl group, a pentyl group or a hexyl group, where they each are an alicyclic hydrocarbon group, preferably, they each are independently a cyclopentyl group or a cyclohexyl group, and where they each are an aromatic hydrocarbon group, preferably, they each are independently a phenyl group, a benzyl group, an alkyl group-substituted phenyl group, or an alkyl group-substituted benzyl group.

In case where $R^h$ is an alkali metal, preferred is lithium, sodium or potassium.

In case where $R^j$ and $R^k$ each are an acyl group, preferably, they each are independently an acetyl group, a propionyl group, a butyryl group, an isobutyryl group, a valeryl group, or an isovaleryl group.

The amine to form a salt with the —COO moiety includes triethylamine, pyridine, trimethylamine, tetramethylammonium, methyldiethylamine, tetraethylammonium, etc.

The acid to form a salt with the —NR$^j$R$^k$ moiety includes hydrochloric acid, sulfuric acid, phosphoric acid, sulfonic acid, carboxylic acid, boric acid, fatty acid, etc.

Specific examples of the amino acid derivative (B) represented by the above-mentioned general formula (Ic) include the following compounds (a) to (d).

[Chem. 4]

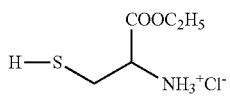

(a)

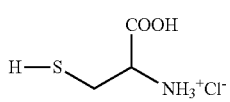

(b)

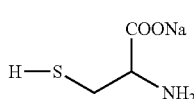

(c)

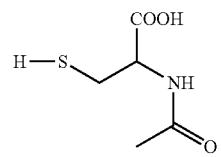

(d)

The amino acid derivative for use in the present invention accelerates the vulcanization rate of the rubber composition and remarkably improves the low-heat-generation property of the rubber composition. In particular, when the amino acid derivative represented by the above-mentioned general formula (Ia) or (Ib) is used, the amino acid derivative exhibits a more excellent effect of accelerating the vulcanization rate of the rubber composition; and when the amino acid derivative represented by the above-mentioned general formula (Ic) is used, the amino acid derivative exhibits a more excellent effect of improving the low-heat-generation property of the rubber composition.

[Filler]

Filler capable of being added to existing rubber compositions is usable as the filler in the present invention, including the inorganic filler (C).

As the filler in the present invention, the inorganic filler (C) may be used along with any other filler, or the inorganic filler (C) may be used alone.

The filler must contain the inorganic filler (C) and this is for improving the low-heat-generation property of the rubber composition.

<Inorganic Filler (C)>

In the present invention, silica is preferred as the inorganic filler (C) from the viewpoint of satisfying both low rolling property and abrasion resistance. As silica, any commercially-available one is usable here; and above all, preferred is wet method silica, dry method silica or colloidal silica, and more preferred is wet method silica. Preferably, the BET specific surface area (as measured according to ISO 5794/1) of silica for use herein is from 40 to 350 m$^2$/g. Silica of which the BET specific surface area falls within the range is advantageous in that it satisfies both rubber-reinforcing capability and dispersibility in rubber component. From this viewpoint, silica of which the BET specific surface area falls within a range of from 80 to 350 m$^2$/g is more preferred, silica of which the BET specific surface area falls within a range of from more than 130 m$^2$/g to 350 m$^2$/g or less is even more preferred, and silica of which the BET specific surface area falls within a range of from 135 to 350 m$^2$/g is especially preferred. As silicas of those types, usable here are commercial products of Tosoh Silica's trade names "Nipsil AQ" (BET specific surface area=205 m$^2$/g) and "Nipsil KQ" (BET specific surface area=240 m$^2$/g), Degussa's trade name "Ultrasil VN3" (BET specific surface area=175 m$^2$/g), etc.

In the rubber composition containing the inorganic filler (C), especially silica therein, incorporating the amino acid derivative (B) used in the invention greatly improves the dispersibility of the inorganic filler (C), especially silica, and therefore significantly improves the low-heat-generation property of the rubber composition.

In the rubber composition containing the inorganic filler (C), such as silica therein, it is desirable that the silane coupling agent (D) is incorporated for the purpose of increasing the ability of silica to reinforce the rubber composition or for the purpose of enhancing the low-heat-generation property and also the abrasion resistance of the rubber composition.

In the rubber composition containing the inorganic filler (C), especially silica and the silane coupling agent (D) therein, it is considered that the amino acid derivative (B) could favorably promote the reaction between the inorganic filler (C) and the silane coupling agent (D). To that effect, in the rubber composition of the present invention, in particular, the dispersibility of silica is greatly enhanced, and therefore the low-heat-generation property of the rubber composition can be thereby significantly improved.

The details of the silane coupling agent (D) are described below.

<Blending Amount of Filler>

Preferably, the filler is in an amount of from 20 to 150 parts by mass relative to 100 parts by mass of the rubber component (A). When the amount of the filler is 20 parts by mass or more, then it is favorable from the viewpoint of improving the ability to reinforce the rubber composition; and when 150 parts by mass or less, then it is favorable from the viewpoint of reducing the rolling resistance.

Preferably, the amount of the inorganic filler (C) is from 20 to 120 parts by mass relative to 100 parts by mass of the rubber component (A). When the amount of the inorganic filler (C) is 20 parts by mass or more, then it is favorable from the viewpoint of securing wet performance; and when 120 parts by mass or less, then it is favorable from the viewpoint of reducing the rolling resistance. Further, the amount is more preferably from 30 to 100 parts by mass.

From the viewpoint of satisfying both the wet performance and the rolling resistance, preferably, the amount of the inorganic filler (C) in the filler is 30% by mass or more, more preferably 40% by mass or more, even more preferably 70% by mass or more.

In case where silica is used as the inorganic filler (C), the amount of silica to be in the filler is preferably 30% by mass or more.

<Other Inorganic Fillers>

The rubber composition of the present invention includes, besides silica, an inorganic compound represented by the following general formula (1).

$$dM^1 \cdot xSiO_y \cdot zH_2O \quad (1)$$

wherein in the general formula (1), $M^1$ represents at least one selected from a metal selected from aluminum, magnesium, titanium, calcium and zirconium, oxides and hydroxides of these metals, hydrates thereof, and carbonate salts of these metals; and d, x, y and z represent an integer of from 1 to 5, an integer of from 0 to 10, an integer of from 2 to 5 and an integer of from 0 to 10, respectively.

In the case where both x and z are 0 in the general formula (1), the inorganic compound becomes at least one metal selected from aluminum, magnesium, titanium, calcium and zirconium, or an oxide or a hydroxide of the metal.

Examples of the inorganic compound represented by the general formula (1) include crystalline aluminosilicate salts and the like containing hydrogen, an alkali metal or an alkaline earth metal, which compensates the charge, for example, alumina ($Al_2O_3$), such as γ-alumina and α-alumina, alumina hydrate ($Al_2O_3 \cdot H_2O$), such as boemite and diaspore, aluminum hydroxide ($Al(OH)_3$), such as gibbsite and bayerite, aluminum carbonate ($Al_2(CO_3)_3$), magnesium hydroxide ($Mg(OH)_2$), magnesium oxide (MgO), magnesium carbonate ($MgCO_3$), talc ($3MgO \cdot 4SiO_2 \cdot H_2O$), attapulgite ($5MgO \cdot 8SiO_2 \cdot 9H_2O$), titanium white ($TiO_2$), titanium black ($TiO_{2n-1}$), calcium oxide (CaO), calcium hydroxide ($Ca(OH)_2$), aluminum magnesium oxide ($MgO \cdot Al_2O_3$), clay ($Al_2O_3 \cdot 2SiO_2$), kaolin ($Al_2O_3 \cdot 2SiO_2 \cdot 2H_2O$), pyrophyllite ($Al_2O_3 \cdot 4SiO_2 \cdot H_2O$), bentonite ($Al_2O_3 \cdot 4SiO_2 \cdot 2H_2O$), aluminum silicate (such as $Al_2SiO_5$ and $Al_4 \cdot 3SiO_4 \cdot 5H_2O$), magnesium silicate (such as $Mg_2SiO_4$ and $MgSiO_3$), calcium silicate (such as $Ca_2 \cdot SiO_4$), aluminum calcium silicate (such as $Al_2O_3 \cdot CaO \cdot 2SiO_2$), magnesium calcium silicate ($CaMgSiO_4$), calcium carbonate ($CaCO_3$), zirconium oxide ($ZrO_2$), zirconium hydroxide ($ZrO(OH)_2 \cdot nH_2O$), zirconium carbonate ($Zr(CO_3)_2$), various kinds of zeolite.

Furthermore, at least one selected from metallic aluminum, an oxide or a hydroxide of aluminum, hydrates thereof, and aluminum carbonate, where $M^1$ is aluminum in the general formula (1), is preferred.

The inorganic compound represented by the general formula (1) may be used solely or as a mixture of two or more kinds thereof. The inorganic compound preferably has an average particle diameter in a range of from 0.01 to 10 μm, and more preferably in a range of from 0.05 to 5 μm, from the standpoint of the balance among the kneading processability, the abrasion resistance and the wet grip performance, and the like.

As the inorganic filler (C) in the present invention, silica may be used solely, or silica and at least one of the inorganic compound represented by the general formula (1) may be used in combination.

<Carbon Black>

The filler of the present invention may contain carbon black depending on necessity. As carbon black, those commercially available can be used. Carbon black contained may provide an effect of decreasing the electric resistance and preventing static charge.

The carbon black used is not particularly limited, and preferred examples thereof used include carbon black of the grades SAF, ISAF, IISAF, N339, HAF, FEF, GPF and SRF, with high, medium or low structure, and preferred examples among these include carbon black of the grades SAF, ISAF, IISAF, N339, HAF and FEF.

The DBP adsorption of the carbon black is preferably from 80 cm³/100 g or more, more preferably 100 cm³/100 g or more, most preferably 110 cm³/100 g or more.

The carbon black preferably has a nitrogen adsorption specific surface area of from 85 m²/g or more, more preferably 100 m²/g or more, most preferably 110 m²/g or more ($N_2SA$, measured according to JIS K6217-2:2001).

[Sulfur and Sulfur Compound]

At least one selected from sulfur and a sulfur compound is incorporated in the rubber composition of the present invention. Sulfur and a sulfur compound are used as a vulcanizing agent. The sulfur compound includes sulfur chloride, morpholine disulfide and polymeric polysulfide.

At least one selected from sulfur and a sulfur compound is incorporated in an amount of from 0.1 to 5 parts by mass, preferably from 0.5 to 3 parts by mass relative to 100 parts by mass of the rubber component (A). The blending amount that falls within the range enables suitable vulcanization of the rubber composition.

[Silane Coupling Agent (D)]

The silane coupling agent (D) which can be used in combination with the inorganic filler (C) is preferably at least one compound selected from the group consisting of compounds represented by the following general formulae (II) to (V).

The following general formulae (II) to (V) will be described in this order below.

[Chem. 5]

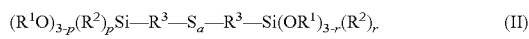

wherein $R^1$, plural groups of which may be the same as or different from each other, each represent a hydrogen atom, a linear, cyclic or branched alkyl group having from 1 to 8 carbon atoms, or a linear or branched alkoxyalkyl group having from 2 to 8 carbon atoms; $R^2$, plural groups of which may be the same as or different from each other, each represent a linear, cyclic or branched alkyl group having from 1 to 8 carbon atoms; $R^3$, plural groups of which may be the same as or different from each other, each represent a linear or branched alkylene group having from 1 to 8 carbon atoms; a represents a number of from 2 to 6 in terms of average value, and p and r may be the same as or different from each other and each represent a number of from 0 to 3 in terms of average value, provided that both p and r are not 3 simultaneously.

Specific examples of the silane coupling agent (D) represented by the general formula (II) include bis(3-triethoxysilylpropyl) tetrasulfide, bis(3-trimethoxysilylpropyl) tetrasulfide, bis(3-methyldimethoxysilylpropyl) tetrasulfide, bis(2-triethoxysilylethyl) tetrasulfide, bis(3-triethoxysilylpropyl) disulfide, bis(3-trimethoxysilylpropyl) disulfide, bis(3-methyldimethoxysilylpropyl) disulfide, bis(2-triethoxysilylethyl) disulfide, bis(3-triethoxysilylpropyl) trisulfide, bis(3-trimethoxysilylpropyl) trisulfide, bis(3-methyldimethoxysilylpropyl) trisulfide, bis(2-triethoxysilylethyl) trisulfide, bis(3-monoethoxydimethylsilylpropyl) tetrasulfide, bis(3-monoethoxydimethylsilylpropyl) trisulfide, bis(3-monoethoxydimethylsilylpropyl) disulfide, bis(3-monomethoxydimethylsilylpropyl) tetrasulfide, bis(3-monomethoxydimethylsilylpropyl) trisulfide, bis(3-monomethoxydimethylsilylpropyl) disulfide, bis(2-monoethoxydimethylsilylethyl) tetrasulfide, bis(2-monoethoxydimethylsilylethyl) trisulfide and bis(2-monoethoxydimethylsilylethyl) disulfide.

[Chem. 6]

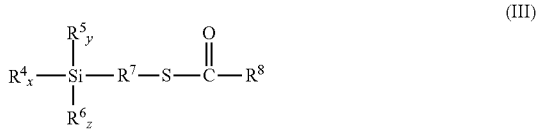

wherein $R^4$ represents a monovalent group selected from —Cl, —Br, $R^9O$—, $R^9C(=O)O$—, $R^9R^{10}C=NO$—, $R^9R^{10}CNO$—, $R^9R^{10}N$— and —$(OSiR^9R^{10})_h$—$(OSiR^9R^{10}R^{11})$(wherein $R^9$, $R^{10}$ and $R^{11}$ each independently represent a hydrogen atom or a monovalent hydrocarbon group having from 1 to 18 carbon atoms; and h represents a number of from 1 to 4 in terms of average value); $R^5$ represents $R^4$, a hydrogen atom or a monovalent hydrocarbon group having from 1 to 18 carbon atoms; $R^6$ represents $R^4$, $R^5$, a hydrogen atom or a group represented by —(O($R^{12}O)_j)_{0.5}$ (wherein $R^{12}$ represents an alkylene group having from 1 to 18 carbon atoms; and j represents an integer of from 1 to 4); $R^7$ represents a divalent hydrocarbon group having from 1 to 18 carbon atoms; $R^8$ represents a monovalent hydrocarbon group having from 1 to 18 carbon atoms; and x, y and z represent numbers that satisfy relationships, x+y+2z=3, 0≤x≤3, 0≤y≤2, and 0≤z≤1.

In the general formula (III), $R^8$, $R^9$, $R^{10}$ and $R^{11}$ may be the same as or different from each other, and each preferably represent a group selected from the group consisting of a linear, cyclic or branched alkyl group, an alkenyl group, an aryl group and an aralkyl group, which each have from 1 to 18 carbon atoms. In the case where $R^5$ represents a monovalent hydrocarbon group having from 1 to 18 carbon atoms, $R^5$ preferably represents a group selected from a linear, cyclic or branched alkyl group, an alkenyl group, an aryl group and an aralkyl group. $R^{12}$ preferably represents a linear, cyclic or branched alkylene group, and particularly preferably a linear group. Examples of the group represented by $R^7$ include an alkylene group having from 1 to 18 carbon atoms, an alkenylene group having from 2 to 18 carbon atoms, a cycloalkylene group having from 5 to 18 carbon atoms, a cycloalkylalkylene group having from 6 to 18 carbon atoms, an arylene group having from 6 to 18 carbon atoms and aralkylene group having from 7 to 18 carbon atoms. The alkylene group and the alkenylene group each may be linear or branched, and the cycloalkylene group, the cycloalkylalkylene group, the arylene group and the aralkylene group each may have a substituent, such as a lower alkyl group, on the ring. Preferred examples of the group represented by $R^7$ include an alkylene group having from 1 to 6 carbon atoms, and particularly preferred examples thereof include a linear alkylene group, such as a methylene group, an ethylene group, a trimethylene group, a tetramethylene group, a pentamethylene group and a hexamethylene group.

Specific examples of the monovalent hydrocarbon group having from 1 to 18 carbon atoms represented by $R^5$, $R^8$, $R^9$, $R^{10}$ and $R^{11}$ in the general formula (III) include a methyl group, an ethyl group, a n-propyl group, an isopropyl group, a n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group, a cyclohexenyl group, a phenyl group, a tolyl group, a xylyl group, a naphthyl group, a benzyl group, a phenethyl group and a naphthylmethyl group.

Specific examples of the group represented by $R^{12}$ in the general formula (III) include a methylene group, an ethylene group, a trimethylene group, a tetramethylene group, a pentamethylene group, a hexamethylene group, an octamethylene group, a decamethylene group and a dodecamethylene group.

Specific examples of the silane coupling agent (D) represented by the general formula (III) include 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane and 2-lauroylthioethyltrimethoxysilane.

Among these, 3-octanoylthiopropyltriethoxysilane ("NXT Silane", a trade name, produced by General Electric Silicones, Inc.) is particularly preferred.

[Chem. 7]

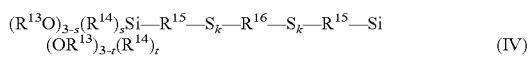

wherein $R^{13}$, plural groups of which may be the same as or different from each other, each represent a hydrogen atom, a linear, cyclic or branched alkyl group having from 1 to 8 carbon atoms, or a linear or branched alkoxyalkyl group having from 2 to 8 carbon atoms; $R^{14}$, plural groups of which may be the same as or different from each other, each represent a linear, cyclic or branched alkyl group having from 1 to 8 carbon atoms; $R^{15}$, plural groups of which may be the same as or different from each other, each represent a linear or branched alkylene group having from 1 to 8 carbon atoms; $R^{16}$ represents a divalent group selected from (—S—$R^{17}$—S—), (—$R^{18}$—$S_{m1}$—$R^{19}$—) and (—$R^{20}$—$S_{m2}$—$R^{21}$—$S_{m3}$—$R^{22}$—) (wherein $R^{17}$ to $R^{22}$ each represent a divalent hydrocarbon group having from 1 to 20 carbon atoms, a divalent aromatic group or a divalent organic group containing a hetero element other than sulfur and oxygen; and m1, m2 and m3 each represent a number of 1 or more and less than 4 in terms of average value); k, plural numbers of which may be the same as or different from each other, each represent a number of from 1 to 6 in terms of average value; and s and t each represent a number of from 0 to 3 in terms of average value, provided that both s and t are not 3 simultaneously.

Specific examples of the silane coupling agent (D) represented by the general formula (IV) include compounds represented by average compositional formula $(CH_3CH_2O)_3Si$—$(CH_2)_3$—$S_2$—$(CH_2)_6$—$S_2$—$(CH_2)_3$—$Si(OCH_2CH_3)_3$, average compositional formula $(CH_3CH_2O)_3Si$—$(CH_2)_3$—$S_2$—$(CH_2)_{10}$—$S_2$—$(CH_2)_3$—$Si(OCH_2CH_3)_3$, average compositional formula $(CH_3CH_2O)_3Si$—$(CH_2)_3$—$S_3$—$(CH_2)_6$—$S_3$—$(CH_2)_3$—$Si(OCH_2CH_3)_3$, average compositional formula $(CH_3CH_2O)_3Si$—$(CH_2)_3$—$S_4$—$(CH_2)_6$—$S_4$—$(CH_2)_3$—$Si(OCH_2CH_3)_3$, average compositional formula $(CH_3CH_2O)_3Si$—$(CH_2)_3$—$S$—$(CH_2)_6$—$S_2$—$(CH_2)_6$—$S$—$(CH_2)_3$—$Si(OCH_2CH_3)_3$, average compositional formula $(CH_3CH_2O)_3Si$—$(CH_2)_3$—$S$—$(CH_2)_6$—$S_{2.5}$—$(CH_2)_6$—$S$—$(CH_2)_3$—$Si(OCH_2CH_3)_3$, average compositional formula $(CH_3CH_2O)_3Si$—$(CH_2)_3$—$S$—$(CH_2)_6$—$S_3$—$(CH_2)_6$—$S$—$(CH_2)_3$—$Si(OCH_2CH_3)_3$, average compositional formula $(CH_3CH_2O)_3Si$—$(CH_2)_3$—$S$—$(CH_2)_6$—$S_4$—$(CH_2)_6$—$S$—$(CH_2)_3$—$Si(OCH_2CH_3)_3$, average compositional formula $(CH_3CH_2O)_3Si$—$(CH_2)_3$—$S$—$(CH_2)_{10}$—$S_2$—$(CH_2)_{10}$—$S$—$(CH_2)_3$—$Si(OCH_2CH_3)_3$, average compositional formula $(CH_3CH_2O)_3Si$—$(CH_2)_3$—$S_4$—$(CH_2)_6$—$S_4$—$(CH_2)_6$—$S_4$—$(CH_2)_3$—$Si(OCH_2CH_3)_3$, average compositional formula $(CH_3CH_2O)_3Si$—$(CH_2)_3$—$S_2$—$(CH_2)_6$—$S_2$—$(CH_2)_6$—$S_2$—$(CH_2)_3$—$Si(OCH_2CH_3)_3$, and average compositional formula $(CH_3CH_2O)_3Si$—$(CH_2)_3$—$S$—$(CH_2)_6$—$S_2$—$(CH_2)_6$—$S_2$—$(CH_2)_6$—$S$—$(CH_2)_3$—$Si(OCH_2CH_3)_3$.

[Chem. 15]

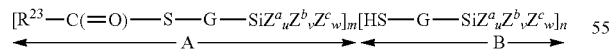

(V)

wherein $R^{23}$ represents a linear, branched or cyclic alkyl group having from 1 to 20 carbon atoms; G, plural groups of which may be the same as or different from each other, each represent an alkanediyl group or an alkenediyl group each having from 1 to 9 carbon atoms; $Z^a$, plural groups of which may be the same as or different from each other, each represent a group that is capable of being bonded to two silicon atoms and represent a functional group selected from (—O—)$_{0.5}$, (—O-G-)$_{0.5}$ and (—O-G-O—)$_{0.5}$; $Z^b$, plural groups of which may be the same as or different from each other, each represent a group that is capable of being bonded to two silicon atoms and represent a functional group represented by (—O-G-O—)$_{0.5}$; $Z^c$, plural groups of which may be the same as or different from each other, each represent a functional group selected from —Cl, —Br, —$OR^p$, $R^pC(=O)O$—, $R^pR^qC=NO$—, $R^pR^qN$—, $R^p$— and HO-G-O—(wherein G agrees with the aforementioned expression); $R^p$ and $R^q$ each represent a linear, branched or cyclic alkyl group having from 1 to 20 carbon atoms; m, n, u, v and w satisfy $1 \le m \le 20$, $0 \le n \le 20$, $0 \le u \le 3$, $0 \le v \le 2$, $0 \le w \le 1$, and $(u/2)+v+2w=2$ or 3; when there are plural moieties represented by A, $Z^a_u$, $Z^b_v$ and $Z^c_w$ each in the plural moieties represented by A may each be the same as or different from each other; and when there are plural moieties represented by B, $Z^a_u$, $Z^b_v$ and $Z^c_w$ each in the plural moieties represented by B may each be the same as or different from each other.

Specific examples of the silane coupling agent (D) represented by the general formula (V) include those represented by the general formula (VI), the general formula (VII) and the general formula (VIII) below.

[Chem. 9]

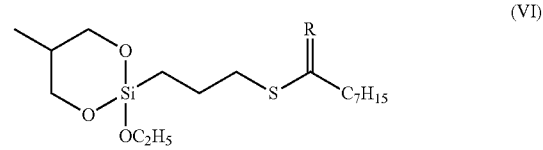

(VI)

[Chem. 10]

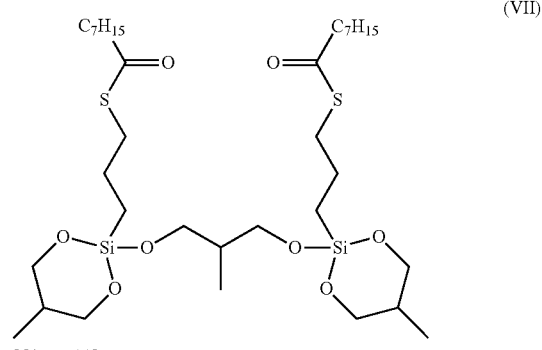

(VII)

[Chem. 11]

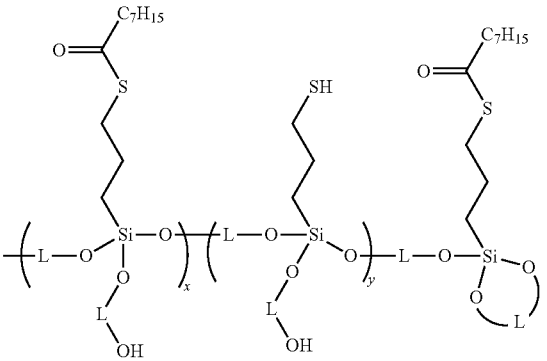

(VIII)

wherein L each independently represent an alkanediyl group or an alkenediyl group each having from 1 to 9 carbon atoms; x=m; and y=n.

As the silane coupling agent represented by the chemical formula (VI), "NXT Low-V Silane", a trade name, produced by Momentive Performance Materials, Inc., is commercially available.

As the silane coupling agent represented by the chemical formula (VII), "NXT Ultra Low-V Silane", a trade name, produced by Momentive Performance Materials, Inc., is similarly commercially available.

As the silane coupling agent represented by the chemical formula (VIII), "NXT-Z", a trade name, produced by Momentive Performance Materials, Inc., is similarly commercially available.

The silane coupling agent (D) in the present invention is especially preferably the compound represented by the general formula (II) among the compounds represented by the general formulae (II) to (V). This is because the amino acid derivative (B) can readily activate the polysulfide bond site that reacts with the rubber component (A).

In the present invention, one alone or two or more different types of the silane coupling agents (D) may be used either singly or as combined.

The amount of the silane coupling agent (D) to be blended in the rubber composition of the present invention is preferably from (1/100) to (20/100) as the ratio by mass {silane coupling agent (D)/inorganic filler (C)}. When the ratio is (1/100) or more, then the rubber composition can more favorably exhibit the effect of improving the low-heat-generation property; and when (20/100) or less, then the cost of the rubber composition may lower and the economic potential thereof may increase. Further, the ratio by mass is more preferably from (3/100) to (20/100), even more preferably from (4/100) to (10/100).

In the rubber composition where the inorganic filler (C) such as silica or the like is incorporated therein, preferably, the silane coupling agent (D) is incorporated for the purpose of enhancing the ability of silica to reinforce the rubber composition or for the purpose of enhancing the low-heat-generation property of the rubber composition and also enhancing the abrasion resistance thereof. However, when the reaction between the inorganic filler (C) and the silane coupling agent (D) is insufficient, then the inorganic filler (C) could not fully exhibit the effect thereof to reinforce the rubber composition, and if so, the abrasion resistance of the composition may lower. Further, when the silane coupling agent that has remained unreacted in the kneading step in preparing the rubber composition reacts in the extrusion step that is carried out after the kneading step, then the extrusion-molded article of the rubber composition would be porous (that is, the article would have many foams or pores), and the accuracy of the dimension and the weight of the extrusion-molded article would be thereby lowered.

As opposed to this, when the frequency of the kneading stages in the kneading step is increased, then the reaction between the inorganic filler (C) and the silane coupling agent (D) could be finished in the kneading step and therefore the formation of the porous structure could be evaded. However, this is problematic in that the productivity in the kneading step greatly lowers.

In the rubber composition of the present invention, the amino acid derivative (B) favorably promotes the reaction between the inorganic filler (C) and the silane coupling agent (D), and therefore a rubber composition having an excellent low-heat-generation property can be obtained here. In particular, when an amino acid derivative represented by the general formula (Ic) is used as the amino acid derivative (B), a rubber composition more excellent in low-heat-generation property could be obtained. To that effect, according to the rubber composition of the present invention, there are provided pneumatic tires which are excellent in workability in rubber processing and have a more favorable low-heat-generation property.

The blending amount of the amino acid derivative (B) to be contained in the rubber composition that contains the silane coupling agent (D) of the present invention, is preferably from (2/100) to (200/100) as the ratio by mass of {amino acid derivative (B)/silane coupling agent (D)}. When the ratio is (2/100) or more, then the silane coupling agent (D) could be fully activated; and when (200/100) or less, then the derivative would not have any significant influence on the vulcanization rate. The blending amount of the amino acid derivative (B) is more preferably from (5/100) to (100/100) as the ratio by mass of {amino acid derivative (B)/silane coupling agent (D)}.

[Vulcanization Accelerator]

In the rubber composition of the present invention, incorporated is a vulcanization accelerator. Not specifically defined, the vulcanization accelerator includes thiazole-type vulcanization accelerators such as M (2-mercaptobenzothiazole), DM (dibenzothiazolyl disulfide), CZ (N-cyclohexyl-2-benzothiazolylsulfenamide), etc.; guanidine-type vulcanization accelerators such as DPG (diphenylguanidine), etc.

[Organic Acid Compound]

An organic acid compound may be incorporated in the rubber composition of the present invention. The organic acid compound includes organic acids, such as saturated fatty acids and unsaturated fatty acids such as stearic acid, palmitic acid, myristic acid, lauric acid, arachidic acid, behenic acid, lignoceric acid, capric acid, pelargonic acid, caprylic acid, enanthic acid, caproic acid, oleic acid, vaccenic acid, linolic acid, linolenic acid, nervonic acid, etc.; as well as resin acids such as rosin acid, modified rosin acid, etc.; esters of the above-mentioned saturated fatty acids and unsaturated fatty acids, esters of resin acids, etc.

In the present invention, the organic acid compound must exhibit the function thereof as a vulcanization accelerator aid, and therefore preferably, stearic acid accounts for 50 mol % or more of the organic acid compound.

In case where an emulsion-polymerized styrene-butadiene copolymer or a natural rubber is used as all or a part of the rubber component (A), it is desirable that 50 mol % or more of the organic acid compound is the rosin acid (including modified rosin acid) and/or fatty acid contained in the emulsion-polymerized styrene-butadiene copolymer or natural rubber.

[Production Method for Rubber Composition]

The production method for the rubber composition of the present invention is a method for producing the rubber composition that contains the rubber component (A), the amino acid derivative (B) and the filler containing the inorganic filler (C), and the method preferably includes at least a first kneading stage of kneading the rubber component (A), the amino acid derivative (B) and all or a part of the inorganic filler (C), and, after the first kneading stage, a final kneading stage of adding thereto at least one selected from sulfur and a sulfur compound, and further kneading them. Preferably, the amino acid derivative (B) is at least one selected from those represented by the above-mentioned general formulae (Ia), (Ib) and (Ic).

Here, at least one selected from sulfur and a sulfur compound is a vulcanizing agent, and the above-described vulcanization accelerator and others may be optionally added along with the vulcanizing agent thereto and kneaded. The first stage of kneading in the present invention is the first stage of kneading the rubber component (A), the amino acid derivative (B) and the filler containing the inorganic filler (c), and does not include a case of kneading the rubber component (A) and the filler except the inorganic filler (C) in the first stage and a case of pre-kneading the rubber component (A) alone.

The maximum temperature of the rubber composition in the first kneading stage in the production method of the present invention is preferably from 120 to 190° C., more preferably from 120 to 175° C., even more preferably from 130 to 175° C. Falling within the range of from 120 to 190° C., the dispersibility of the inorganic filler (C) can be favorably improved, and in the rubber composition containing the inorganic filler (C) and the silane coupling agent (D) described later, the reaction between the silane coupling agent (D) and the rubber component (A) can be favorably promoted.

The kneading time of the first kneading stage is preferably from 10 seconds to 20 minutes, preferably from 10 seconds to 10 minutes, and preferably from 30 seconds to 5 minutes.

The rubber composition of the present invention is prepared mainly by kneading the rubber component (A) and the filler, and in general, the composition is prepared in two stages of a master batch kneading stage that is a step before incorporation of a vulcanizing agent and an optional vulcanization accelerator thereinto, and a final kneading stage of incorporating the vulcanizing agent and the optional vulcanization accelerator to prepare a vulcanizable rubber composition.

The above-mentioned first kneading stage corresponds to the master batch kneading stage in this embodiment. Between the mater batch kneading stage and the final kneading stage, the production method may include an intermediate kneading stage mainly for lowering the viscosity of the master batch.

In the present invention, the kneading stage before the final stage, such as the first stage, the intermediate stage and others, is a step of blending and kneading the other starting materials than the vulcanization chemicals (vulcanizing agent, vulcanization accelerator) containing at least one selected from sulfur and a sulfur compound, such as the rubber component, the inorganic filler, the acid compound, the coupling agent and the like, and is a step of dispersing the inorganic filler in the rubber composition for reinforcing the rubber component. The present invention is characterized in that the amino acid derivative (B) is incorporated in the first stage to thereby better the dispersion of the inorganic filler in the rubber composition. If desired, the rubber component, the filler and others may be blended and kneaded in the intermediate stage.

In case where the production method includes the intermediate stage after the first stage and before the final stage, the maximum temperature of the rubber composition in the intermediate kneading stage is preferably from 120 to 190° C., more preferably from 130 to 175° C., even more preferably from 140 to 170° C. The kneading time is preferably from 10 seconds to 20 minutes, more preferably rom 10 seconds to 10 minutes, even more preferably from 30 seconds to 5 minutes. In case where the production method includes the intermediate stage, it is desirable that, after the first kneading stage, the temperature of the rubber composition is lowered by 10° C. or more than the temperature thereof at the end of kneading in the previous stage, and then the process goes on to the next stage.

The final kneading stage is a step of blending vulcanization chemicals (vulcanizing agent, vulcanization accelerator) containing at least one selected from sulfur and a sulfur compound and kneading them. The maximum temperature of the rubber composition in this final stage is preferably from 60 to 140° C., more preferably from 80 to 120° C., even more preferably from 100 to 120° C. The kneading time is preferably from 10 seconds to 20 minutes, more preferably from 10 seconds to 10 minutes, even more preferably from 20 seconds to 5 minutes.

While going on from the first stage, to the intermediate stage and to the final stage, it is desirable that the temperature of the rubber composition is lowered by 10° C. or more than the temperature thereof at the end of kneading in the previous stage, and then the process goes on to the next stage.

In the master batch kneading stage in the rubber composition production method of the present invention, at least the rubber component (A), the amino acid derivative (B), all or a part of the inorganic filler (C), and all or a part of the silane coupling agent (D) may be kneaded and the alcohol such as ethanol or the like and the other volatile organic component that are produced during the reaction between the inorganic filler (C) and the silane coupling agent (D) can be evaporated away during the kneading operation. Accordingly, it is possible to prevent alcohol and others from being evaporated away in the extrusion step to be carried out after the master batch kneading step, and it is therefore possible to prevent a porous structure from being formed in the extrusion-molded article.

In the first kneading stage in the present invention, it is desirable that the amino acid derivative (B) is added to the system in such a manner that the ratio by mass of {amino acid derivative (B)/silane coupling agent (D)} could be from (2/100) to (200/100). When the ratio is (2/100) or more, then the silane coupling agent (D) could be fully activated, and when (200/100) or less, then the derivative would not have any significant influence on the vulcanization rate. More preferably, the amino acid derivative (B) is added in such a manner that the ratio by mass of {amino acid derivative (B)/silane coupling agent (D)} could be from (5/100) to (100/100).

Regarding the method of putting the amino acid derivative (B) into the system in the first kneading stage in the present invention, it is desirable that, after the rubber component (A) and all or a part of the inorganic filler (C) are kneaded, the amino acid derivative (B) is added thereto and further kneaded. This is because, according to the adding method of the type, the dispersibility of the inorganic filler (C) can be further improved.

Regarding the method of putting the amino acid derivative (B) into the system in the first kneading stage in the present invention for the rubber composition that contains the filler containing the inorganic filler (c) and the silane coupling agent (D), it is desirable that, after the rubber component (A), all or a part of the inorganic filler (C) and all or a part of the silane coupling agent (D) are kneaded, the amino acid derivative (B) is added thereto and further kneaded. This is because, according to the adding method of the type, the reaction between the silane coupling agent (D)

and the rubber component (A) can be promoted after the reaction between the silane coupling agent (D) and silica has sufficiently run on.

In case where the master batch is difficult to prepare in one master batch kneading stage, or if desired, the master batch kneading stage may be divided into two stages of the first master batch kneading stage and the second master batch kneading stage.

For example, in the first kneading stage (that is, the master batch kneading stage), the rubber component (A), all or a part of the inorganic filler (C) and all or a part of the silane coupling agent (D) may be kneaded as the first master batch kneading stage, then spontaneously cooled and cured, and thereafter as the second master batch kneading stage, the amino acid derivative (B) may be added thereto and further kneaded.

In the rubber composition production method of the present invention, in general, various additives, for example, a vulcanization activator, an antiaging agent or the like such as stearic acid, zinc oxide and others to be incorporated in the rubber composition may be, if desired, kneaded in the composition in the master batch kneading stage or the final kneading stage, or in the above-mentioned intermediate kneading stage.

The rubber composition in the present invention is kneaded with a Banbury mixer, a roll, an intensive mixer, a kneader, a twin-screw extruder or the like. Afterwards, the composition is extruded and worked in the subsequent extrusion step and is thus formed as tread members. Subsequently, this is stuck and shaped according to an ordinary method using a tire forming machine, thereby forming an unvulcanized tire. The unvulcanized tire is heated under pressure in a vulcanizing machine to give a tire. The rubber composition of the present invention is useful for tires and is especially favorably used for treads. In the present invention, the tread means the cap tread to constitute the grounding part of a tire and/or a base tread to be arranged inside the cap tread. The rubber composition of the present invention is also favorably used for other various members of pneumatic tires, such as side wall, bead filler (stiffener) and others, in addition to treads of pneumatic tires.

EXAMPLES

The present invention is described in more detail with reference to the following Examples; however, the present invention is not limited at all by the following Examples.

[Evaluation Methods]
<Vulcanization Rate>

Using a rotorless rheometer, RLR-3 Model manufactured by Toyo Seiki Seisaku-sho, Ltd., a sample was given a constant amplitude vibration, and the time-dependent variation of the torque having been generated through the deformation of the sample and transferred onto a dice was automatically recorded. The time (min) corresponding to t0.9=90% vulcanization time (min)={(maximum torque−minimum torque)×0.9+minimum torque} was indexed to give the index of the vulcanization rate. The samples having a smaller index value have a higher vulcanization accelerating effect.

<Low-Heat-Generation Property (Tan δ Index)>

Using a viscoelasticity measuring device (manufactured by Rheometric Scientific, Inc.), tan δ of a sample was measured at a temperature of 60° C., at a dynamic strain of 5% and at a frequency of 15 Hz. Based on the reciprocal number of the tan δ in Comparative Example 1, as referred to 100, the data were expressed as index indication according to the following formula. The samples having a larger index value have a better low-heat-generation property and have a smaller hysteresis loss.

Low-Heat-Generation Index={(tan δ of vulcanized rubber composition in Comparative Example 1)/(tan δ of vulcanized rubber composition tested)}×100

Examples 1 to 7, Comparative Examples 1, 2

In the first kneading stage of kneading the rubber composition of Examples 1 to 7, the rubber component (A), all of the inorganic filler (C), the silane coupling agent (D), carbon black, aromatic oil, stearic acid and antioxidant 6PPD were kneaded in a Banbury mixer. Next, in the final kneading stage, the additives shown in Table 1 were added thereto and kneaded, and the maximum temperature of the rubber composition in the final kneading stage was controlled to be 110° C.

The vulcanization rate of the vulcanized rubber compositions obtained from these 9 types of rubber compositions was evaluated. The results are shown in Table 1.

[Table 1]

TABLE 1

| Components (part by mass) | Example 1 | Example 2 | Example 3 | Example 4 | Example 5 | Example 6 | Example 7 | Comparative Example 1 | Comparative Example 2 |
|---|---|---|---|---|---|---|---|---|---|
| SBR *1 | 100 | 100 | 100 | 100 | 100 | 50 | 50 | 100 | 100 |
| Natural Rubber *2 | 0 | 0 | 0 | 0 | 0 | 50 | 50 | 0 | 0 |
| Carbon Black-1 N220 *3 | 10 | 10 | 10 | 10 | 10 | 10 | 10 | 10 | 10 |
| Silica *4 | 50 | 50 | 50 | 50 | 50 | 50 | 50 | 50 | 50 |
| Silane Coupling Agent Si75 *5 | 5 | 5 | 5 | 5 | 5 | 5 | 5 | 5 | 5 |
| Aromatic Oil | 30 | 30 | 30 | 30 | 30 | 30 | 30 | 30 | 30 |
| Stearic Acid | 2 | 2 | 2 | 2 | 2 | 2 | 2 | 2 | 2 |
| Zinc Flower | 2.5 | 2.5 | 2.5 | 2.5 | 2.5 | 2.5 | 2.5 | 2.5 | 2.5 |
| Antioxidant TMDQ *6 | 1 | 1 | 1 | 1 | 1 | 1 | 1 | 1 | 1 |
| Antioxidant 6PPD *7 | 1 | 1 | 1 | 1 | 1 | 1 | 1 | 1 | 1 |
| Vulcanization Accelerator MBTS *8 | 1 | 1 | 1 | 1 | 1 | 1 | 1 | 1 | 1 |
| Vulcanization Accelerator TBBS *9 | 0.6 | 0.6 | 0.6 | 0.6 | 0.6 | 0.6 | 0.6 | 0.6 | 0.6 |
| Amino Acid Derivative (B)-(Ia) *10 | 0.25 | 0.5 | 1 | 2 | 0 | 1 | 0 | 0 | 0 |
| Amino Acid Derivative (B)-(Ia) *11 | 0 | 0 | 0 | 0 | 1 | 0 | 1 | 0 | 0 |

TABLE 1-continued

|  | Example | | | | | | | Comparative Example | |
|---|---|---|---|---|---|---|---|---|---|
| Components (part by mass) | 1 | 2 | 3 | 4 | 5 | 6 | 7 | 1 | 2 |
| Cysteine | 0 | 0 | 0 | 0 | 0 | 0 | 0 | 0 | 1 |
| Sulfur | 1.5 | 1.5 | 1.5 | 1.5 | 1.5 | 1.5 | 1.5 | 1.5 | 1.5 |
| Vulcanization Rate index | 96 | 92 | 80 | 75 | 82 | 79 | 80 | 100 | 103 |

*1 Asahi Kasei's solution-polymerized SBR, trade name "Toughden 2000"
*2 JSR's RSS#3
*3 Asahi Carbon's #80
*4 Tosoh Silica's Nipseal AQ, BET surface area = 205 m$^2$/g
*5 bis(3-triethoxysilylpropyl) disulfide
*6 Ouchi Shinko Chemical's Noclac 224
*7 Ouchi Shinko Chemical's Noclac 6C
*8 Sanshin Chemical's Sanceler DM
*9 Sanshin Chemical's Sanceler NS
*10 compound of general formula (Ia) where Ra is a guanidylpropyl group and Rd is sodium.
*11 compound of general formula (Ia) where Ra is mercaptomethylene and Rd is sodium.

[Notes]
In Table 1, *1 to *11 are as follows:
*1: Asahi Kasei's solution-polymerized SBR, trade name "Toughden 2000"
*2: RSS#3
*3: N220 (ISAF), Asahi Carbon's trade name, "#80"
*4: Tosoh Silica's trade name, "Nipseal AQ" (BET surface area = 220 m$^2$/g)
*5: bis(3-triethoxysilylpropyl) disulfide (mean sulfur length: 2.35), Evonik's silane coupling agent, trade name "Si75"™
*6: 2,2,4-trimethyl-1,2-dihydroquinoline polymer, Ouchi Shinko Chemical's trade name "Noclac 224"
*7: N-(1,3-dimehtylbutyl)-N'-phenyl-p-phenylenediamine, Ouchi Shinko Chemical's trade name "Noclac 6C"
*8: di-2-benzothiazolyl disulfide, Sanshin Chemical's trade name "Sanceler DM"
*9: N-tert-butyl-2-benzothiazolylsulfenamide, Sanshin Chemical's trade name "Sanceler NS"
*10: compound of amino acid derivative (B) of general formula (Ia) where R$^a$ is a guanidylpropyl group and R$^d$ is sodium.
*11: compound of amino acid derivative (B) of general formula (Ia) where R$^a$ is mercaptomethylene and R$^d$ is sodium.

Examples 8 to 18, Comparative Examples 3, 4, 5

In the first kneading stage of kneading the rubber composition of Examples 8 to 18, the rubber component (A), all of the inorganic filler (C), the silane coupling agent (D), carbon black, aromatic oil, stearic acid and antioxidant 6PPD were kneaded in a Banbury mixer, and after 60 seconds, different types of amino acid derivatives (B) represented by the above-mentioned general formula (Ic) were added thereto and further kneaded. The maximum temperature of the rubber composition in the first kneading stage was controlled to be 150° C. Next, in the final kneading stage, the additives shown in Table 2 were added thereto and kneaded, and the maximum temperature of the rubber composition in the final kneading stage was controlled to be 110° C. In Comparative Examples 3 and 4, the components were kneaded in the same manner as in Examples 1 to 11 except that the amino acid derivative (B) was not added in the first kneading stage. In Comparative Example 5, the components were kneaded in the same manner as in Examples 8 to 18 except that cysteine was used in place of the amino acid derivative (B) in Examples.

The low-heat-generation property of the vulcanized rubber compositions obtained from these 14 types of rubber compositions was evaluated. The results are shown in Table 2.

TABLE 2

| | | part by mass | Example | | | | | | | | | | | Comparative Example | | |
|---|---|---|---|---|---|---|---|---|---|---|---|---|---|---|---|---|
| | | | 8 | 9 | 10 | 11 | 12 | 13 | 14 | 15 | 16 | 17 | 18 | 3 | 4 | 5 |
| Formulation of Rubber Composition | First Kneading Stage | SBR *1 | 100 | 100 | 100 | 100 | 100 | 100 | 100 | 50 | 50 | 50 | 50 | 100 | 50 | 100 |
| | | Natural Rubber *2 | 0 | 0 | 0 | 0 | 0 | 0 | 0 | 50 | 50 | 50 | 50 | 0 | 50 | 0 |
| | | Carbon Black N220 *3 | 10 | 10 | 10 | 10 | 10 | 10 | 10 | 10 | 10 | 10 | 10 | 10 | 10 | 10 |
| | | Silica *4 | 50 | 50 | 50 | 50 | 50 | 50 | 50 | 50 | 50 | 50 | 50 | 50 | 50 | 50 |
| | | Silane Coupling Agent Si75 *5 | 5 | 5 | 5 | 5 | 5 | 5 | 5 | 5 | 5 | 5 | 5 | 5 | 5 | 5 |
| | | Amino Acid Derivative (B)-(Ic)-(a) *6 | 0.25 | 0.5 | 1 | 2 | 0 | 0 | 0 | 1 | 0 | 0 | 0 | 0 | 0 | 0 |
| | | Amino Acid Derivative (B)-(Ic)-(b) *7 | 0 | 0 | 0 | 0 | 1 | 0 | 0 | 0 | 1 | 0 | 0 | 0 | 0 | 0 |
| | | Amino Acid Derivative (B)-(Ic)-(c) *8 | 0 | 0 | 0 | 0 | 0 | 1 | 0 | 0 | 0 | 1 | 0 | 0 | 0 | 0 |
| | | Amino Acid Derivative (B)-(Ic)-(d) *9 | 0 | 0 | 0 | 0 | 0 | 0 | 1 | 0 | 0 | 0 | 1 | 0 | 0 | 0 |
| | | Cysteine | 0 | 0 | 0 | 0 | 0 | 0 | 0 | 0 | 0 | 0 | 0 | 0 | 0 | 1 |
| | | Aromatic Oil | 30 | 30 | 30 | 30 | 30 | 30 | 30 | 30 | 30 | 30 | 30 | 30 | 30 | 30 |
| | | Stearic Acid | 2 | 2 | 2 | 2 | 2 | 2 | 2 | 2 | 2 | 2 | 2 | 2 | 2 | 2 |

TABLE 2-continued

| | part by mass | Example 8 | 9 | 10 | 11 | 12 | 13 | 14 | 15 | 16 | 17 | 18 | Comparative Example 3 | 4 | 5 |
|---|---|---|---|---|---|---|---|---|---|---|---|---|---|---|---|
| Final Kneading Stage | Antiaging Agent 6PPD *10 | 1 | 1 | 1 | 1 | 1 | 1 | 1 | 1 | 1 | 1 | 1 | 1 | 1 | 1 |
| | Zinc Flower | 2.5 | 2.5 | 2.5 | 2.5 | 2.5 | 2.5 | 2.5 | 2.5 | 2.5 | 2.5 | 2.5 | 2.5 | 2.5 | 2.5 |
| | Antiaging Agent TMDQ *11 | 1 | 1 | 1 | 1 | 1 | 1 | 1 | 1 | 1 | 1 | 1 | 1 | 1 | 1 |
| | Vulcanization Accelerator DPG *12 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Vulcanization Accelerator MBTS *13 | 1 | 1 | 1 | 1 | 1 | 1 | 1 | 1 | 1 | 1 | 1 | 1 | 1 | 1 |
| | Vulcanization Accelerator TBBS *14 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Sulfur | 1.5 | 1.5 | 1.5 | 1.5 | 1.5 | 1.5 | 1.5 | 1.5 | 1.5 | 1.5 | 1.5 | 1.5 | 1.5 | 1.5 |
| Properties of Vulcanized Rubber | Low-Heat-Generation Property (tanδ index) | 120 | 122 | 123 | 124 | 122 | 123 | 115 | 121 | 120 | 121 | 113 | 100 | 101 | 99 |

[Notes]
In Table 2, *1 to *14 are as follows:
*1: Asahi Kasei's solution-polymerized SBR, trade name "Toughden 2000"
*2: RSS#3
*3: N220 (ISAF), Asahi Carbon's trade name, #80
*4: Tosoh Silica's trade name, "Nipseal AQ" (BET surface area = 205 m²/g)
*5: bis(3-triethoxysilylpropyl) disulfide (mean sulfur length: 2.35), Evonik's silane coupling agent, trade name "Si75"™
6*: amino acid derivative (B) of general formula (Ic), compound (a)
7*: amino acid derivative (B) of general formula (Ic), compound (b)
8*: amino acid derivative (B) of general formula (Ic), compound (c)
9*: amino acid derivative (B) of general formula (Ic), compound (d)
*10: N-(1,3-dimehtylbutyl)-N'-phenyl-p-phenylenediamine, Ouchi Shinko Chemical's trade name "Noclac 6C"
*11: 2,2,4-trimethyl-1,2-dihydroquinoline polymer, Ouchi Shinko Chemical's trade name "Noclac 224"
*12: 1,3-diphenylguanidine, Sanshin Chemical's trade name "Sanceler D"
*13: di-2-benzothiazolyl disulfide, Sanshin Chemical's trade name "Sanceler DM"
*14: N-tert-butyl-2-benzothiazolylsulfenamide, Sanshin Chemical's trade name "Sanceler NS"

As obvious from Table 1, the rubber compositions of Examples 1 to 7 all have a high vulcanization rate, as compared with the comparative rubber compositions of Comparative Examples 1 and 2.

As obvious from Table 2, the rubber compositions of Examples 8 to 18 all have a good low-heat-generation property (tan δ index) as compared with the comparative rubber compositions of Comparative Examples 3 to 5.

INDUSTRIAL APPLICABILITY

Using an amino acid derivative prepared from a biomass starting material as a vulcanization accelerator, the rubber composition of the present invention has favorable vulcanization characteristics and is therefore favorably used for constitutive members of various types of pneumatic tires for passenger cars, small-sized trucks, minivans, pickup trucks and large-sized vehicles (trucks, buses, construction vehicles, etc.) and others, especially for tread members of pneumatic radial tires.

In addition, in the rubber composition of the present invention, the dispersibility of the filler is improved, and the composition has an excellent low-heat-generation property, and further, the activity of the coupling function of the silane coupling agent can be favorably prevented from being lowered, and the coupling function thereof is further enhanced, and therefore the composition has an especially excellent low-heat-generation property. Accordingly, the rubber composition is favorable for constitutive members of various types of pneumatic tires (especially pneumatic radial tires) for passenger cars, small-sized trucks, minivans, pickup trucks and large-sized vehicles (trucks, buses, construction vehicles, etc.) and others, especially for tread members of pneumatic tires.

The invention claimed is:

1. A rubber composition comprising, as blended, a rubber component (A), an amino acid derivative (B) and a filler containing an inorganic filler (C), and further containing, as incorporated therein, at least one selected from sulfur and a sulfur compound, in which the amino acid derivative (B) is represented by the following formula (Ic):

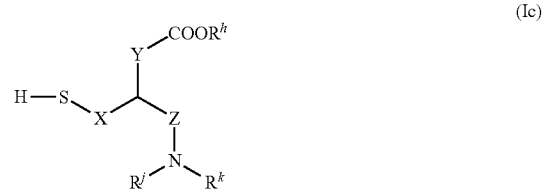

in the formula, X represents a divalent hydrocarbon group having a linear alkylene group and having from 1 to 10 carbon atoms, Y and Z each independently represent a single bond or an alkylene group having from 1 to 10 carbon atoms, $R^h$ is selected from a hydrogen atom, an aliphatic hydrocarbon group, an alicyclic hydrocarbon group, an aromatic hydrocarbon group and an alkali metal, $R^j$ and $R^k$ are a hydrogen atom, the —COO moiety may form a salt with an amine, the —NR$^j$R$^k$ moiety may form a salt with an acid, however, when $R^h$ is a hydrogen atom, the compound must form a salt, and in case where the compound does not form a salt, $R^h$ is not a hydrogen atom.

2. The rubber composition according to claim 1, wherein the amino acid derivative (B) represented by formula (Ic) is selected from the group consisting of the following formulae (a), (b), (c) and (d):

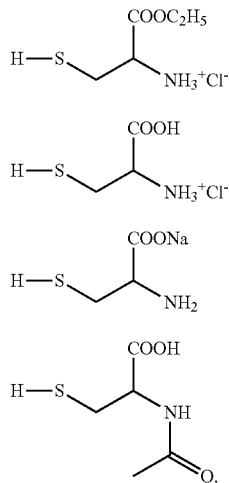

3. A method for producing a rubber composition containing a rubber component (A), an amino acid derivative (B) and a filler containing an inorganic filler (C), which comprises:
a first kneading stage of kneading the rubber component (A), the amino acid derivative (B) and all or a part of the inorganic filler (C), and
a final kneading stage of, after the first kneading stage, adding thereto at least one selected from sulfur and a sulfur compound and kneading them, in which the amino acid derivative (B) is represented by the following formula (Ic):

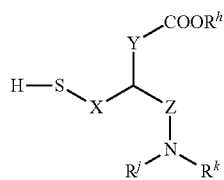

in the formula, X represents a divalent hydrocarbon group having a linear alkylene group and having from 1 to 10 carbon atoms, Y and Z each independently represent a single bond or an alkylene group having from 1 to 10 carbon atoms, $R^h$ is selected from a hydrogen atom, an aliphatic hydrocarbon group, an alicyclic hydrocarbon group, an aromatic hydrocarbon group and an alkali metal, $R^j$ and $R^k$ are a hydrogen atom, the —COO moiety may form a salt with an amine, the —$NR^jR^k$ moiety may form a salt with an acid, however, when $R^h$ is a hydrogen atom, the compound must form a salt, and in case where the compound does not form a salt, $R^h$ is not a hydrogen atom.

4. The method for producing a rubber composition according to claim 3, wherein in the first kneading stage, after the rubber component (A) and all or a part of the inorganic filler (C) are kneaded, the amino acid derivative (B) is added thereto and further kneaded.

5. The method for producing a rubber composition according to claim 3, wherein the amino acid derivative (B) represented by formula (Ic) is selected from the group consisting of the following formulae (a), (b), (c) and (d):

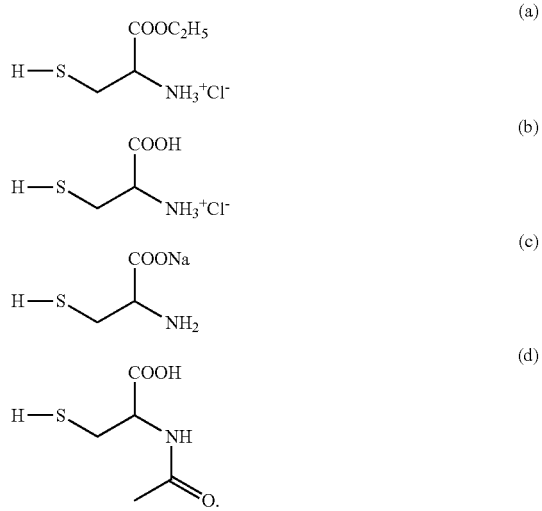

* * * * *